United States Patent
Kato

(10) Patent No.: US 9,604,306 B2
(45) Date of Patent: Mar. 28, 2017

(54) FRICTION-STIR WELDING TOOL, FRICTION STIR WELDING DEVICE, AND METHOD FOR MANUFACTURING WELDING MATERIAL

(71) Applicant: MITSUBISHI HEAVY INDUSTRIES, LTD., Tokyo (JP)

(72) Inventor: Yoshinori Kato, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/775,572

(22) PCT Filed: Apr. 25, 2013

(86) PCT No.: PCT/JP2013/062191
§ 371 (c)(1),
(2) Date: Sep. 11, 2015

(87) PCT Pub. No.: WO2014/174629
PCT Pub. Date: Oct. 30, 2014

(65) Prior Publication Data
US 2016/0059345 A1 Mar. 3, 2016

(51) Int. Cl.
*B23K 20/12* (2006.01)
*B23K 37/02* (2006.01)

(52) U.S. Cl.
CPC ........ *B23K 20/1255* (2013.01); *B23K 20/122* (2013.01); *B23K 20/126* (2013.01);
(Continued)

(58) Field of Classification Search
CPC ............. B23K 20/122–20/128; B23K 37/0235
(Continued)

(56) References Cited

U.S. PATENT DOCUMENTS 6,237,835 B1 * 5/2001 Litwinski ........... B23K 20/1255
228/112.1
7,992,761 B2 * 8/2011 Baumann ............. B23K 20/123
228/102
(Continued)

FOREIGN PATENT DOCUMENTS

JP 2002-86281 A 3/2002
JP 2003-71577 A 3/2003
(Continued)

OTHER PUBLICATIONS

International Search Report mailed Jul. 16, 2013, corresponding to International Patent Application No. PCT/JP2013/062191.
(Continued)

*Primary Examiner* — Kiley Stoner
(74) *Attorney, Agent, or Firm* — Kanesaka Berner and Partners LLP

(57) ABSTRACT

A friction-stir welding tool includes a front shoulder; a rear shoulder in contact with plate materials; and a probe penetrating the plate materials between the front and rear shoulders, the probe connecting the front shoulder and the rear shoulder to each other. The probe has a first screw part provided on at least one axial end section, and at least one of the front shoulder and the rear shoulder has a second screw part in threaded engagement with the first screw part, the threaded engagement changing so that the rear shoulder and the front shoulder approach each other along the axial direction as the front shoulder and the rear shoulder rotate relative to each other, and the threaded engagement with the first screw part linking at least one of the rear shoulder and the front shoulder with the probe.

8 Claims, 6 Drawing Sheets

(52) U.S. Cl.
CPC ...... *B23K 20/1225* (2013.01); *B23K 20/1245* (2013.01); *B23K 37/0235* (2013.01)

(58) Field of Classification Search
USPC .............................. 228/112.1–114.5, 2.1–2.3
See application file for complete search history.

(56) References Cited

U.S. PATENT DOCUMENTS

| | | | | |
|---|---|---|---|---|
| 2001/0011674 | A1* | 8/2001 | Ezumi | B23K 20/122 228/112.1 |
| 2003/0201307 | A1 | 10/2003 | Waldron et al. | |
| 2004/0035914 | A1 | 2/2004 | Hempstead | |
| 2006/0043151 | A1* | 3/2006 | Stol | B23K 20/1255 228/2.1 |
| 2006/0043152 | A1* | 3/2006 | Stol | B23K 20/1255 228/2.1 |
| 2006/0065694 | A1* | 3/2006 | Stol | B23K 20/1255 228/2.1 |
| 2008/0217377 | A1* | 9/2008 | Stol | B23K 20/1255 228/2.3 |
| 2009/0184201 | A1* | 7/2009 | Talwar | B23K 20/1255 244/119 |
| 2010/0163603 | A1* | 7/2010 | Stol | B23K 20/125 228/112.1 |
| 2010/0213242 | A1* | 8/2010 | Fujimoto | B23K 20/1245 228/2.1 |
| 2012/0248174 | A1* | 10/2012 | dos Santos | B23K 20/122 228/2.1 |
| 2015/0273623 | A1* | 10/2015 | Kato | B23K 20/1245 228/112.1 |
| 2016/0074957 | A1* | 3/2016 | Nishida | B23K 37/0235 228/114.5 |
| 2016/0151855 | A1* | 6/2016 | Fukuda | B23K 20/124 228/114.5 |

FOREIGN PATENT DOCUMENTS

| | | |
|---|---|---|
| JP | 2003-181656 A | 7/2003 |
| JP | 2004-160475 A | 6/2004 |
| JP | 2004-243375 A | 9/2004 |
| JP | 2005-74518 A | 3/2005 |
| JP | 2005-519769 A | 7/2005 |
| JP | 2008-36664 A | 2/2008 |
| JP | 2012-245542 A | 12/2012 |
| JP | 2012-250277 A | 12/2012 |
| WO | 2006/081819 A1 | 8/2006 |

OTHER PUBLICATIONS

Written Opinion mailed Jul. 16, 2013, corresponding to International Patent Application No. PCT/JP2013/062191.
Extended European Search Report in EP Application No. 13882834.8, dated Apr. 5, 2016.

* cited by examiner

FRICTION-STIR WELDING TOOL, FRICTION STIR WELDING DEVICE, AND METHOD FOR MANUFACTURING WELDING MATERIAL

RELATED APPLICATIONS

The present application is a National Phase of International Application Number PCT/JP2013/062191, filed Apr. 25, 2013.

TECHNICAL FIELD

The present invention relates to a friction-stir welding tool used when plate materials are abutted to each other to be welded, a friction stir welding device, and a method for manufacturing welding material using the friction-stir welding tool.

BACKGROUND ART

As a method for welding a work-piece configured of two members, friction stir welding is known. Friction stir welding is a welding method in which a tool is rotated in a state where an abutment portion of the work-piece is pressurized by a shoulder surface of the tool and in which the work-piece is welded using friction heat generated on the surface of the work-piece.

Meanwhile, in the friction stir welding, a tool referred to as a bobbin tool may be used. In the bobbin tool, a front side shoulder having one shoulder surface is disposed on a front surface side of the work-piece, a rear side shoulder having the other shoulder surface opposing the one shoulder surface is disposed on a rear surface side of the work-piece, and the two shoulders are connected to each other by a probe penetrating the work-piece. In this way, the front surface and the rear surface of the work-piece are interposed between the shoulder surfaces of the two shoulders and pressurized, frictional heat is generated, the work-piece is stirred by the probe, and thus, the friction stir welding of the work-piece is performed.

Here, in the work-piece, non-uniformity of plate thickness due to distortion or manufacturing errors may occur. Particularly, in an outer plate or the like which is used in a vehicle of a track transportation system referred to as an automated people mover (APM) or a train, a long hollow panel is used. Moreover, in the long member, significant change in the thickness in the length direction occurs. In addition, for example, when the plate thickness in the weld direction is thin, welding pressure from the shoulder surfaces to the work-piece decreases, and there is a concern that sufficient welding quality may not be obtained.

PTL 1 discloses a friction stir welding mechanism which controls a gap between shoulder surfaces by allowing a lower shoulder (rear side shoulder) to move close to and move away from an upper shoulder (front side shoulder) using hydraulic pressure according to a change in a plate thickness of a work-piece, and can adjust welding pressure with respect to the work-piece.

CITATION LIST

Patent Literature

[PTL 1] Japanese Unexamined Patent Application Publication No. 2004-243375

SUMMARY OF INVENTION

Technical Problem

However, although it is not specifically described in PTL 1, in the mechanism, a control device which controls the hydraulic pressure is separately required. Accordingly, the entire friction stir welding device is complicated, and thus, cost increases.

The present invention provides a friction-stir welding tool, a friction stir welding device, and a method for manufacturing welding material capable of accurately performing friction stir welding while decreasing cost using a simple structure.

Solution to Problem

According to a first aspect of the present invention, there is provided a friction-stir welding tool, including: an axially extending front side shoulder; a rear side shoulder which is provided to axially oppose the front side shoulder, and comes into contact with plate materials to interpose an abutment portion of the plate materials between the front side shoulder and the rear side shoulder; and a probe which is disposed to penetrate the plate materials between the front side shoulder and the rear side shoulder, extends in the axis direction, and connects the front side shoulder and the rear side shoulder to each other. The probe includes a first screw part provided on at least one axial end section, and at least one of the front side shoulder and the rear side shoulder includes a second screw part, the second screw part is in threaded engagement with the first screw part, the state of the threaded engagement is changed so that the front side shoulder and the rear side shoulder axially move close to each other as the front side shoulder and the rear side shoulder rotate relative to each other, and the second screw part links at least one of the front side shoulder and the rear side shoulder with the probe due to the threaded engagement between the first screw part and the second screw part.

According to this friction-stir welding tool, the front side shoulder and the rear side shoulder are rotated in the state where the plate materials are interposed between the front side shoulder and the rear side shoulder, and the plate materials are welded by the friction stir welding. Here, since the rear side shoulder comes into contact with the plate materials, a friction force is applied to a portion between the rear side shoulder and the plate materials during the welding. If the friction force from the plate materials is applied to the rear side shoulder, the rotation of the rear side shoulder is suppressed by the friction force. Meanwhile, since the front side shoulder rotates without interference due to rotation, a force by which the front side shoulder and the rear side shoulder are to be rotated relative to each other is generated between the front side shoulder and the rear side shoulder. In addition, in the present invention, the state of the threaded engagement between the first screw part and the second screw part is changed such that the front side shoulder and the rear side shoulder move closer to each other according to the relative rotation thereof. Here, when the front side shoulder and the rear side shoulder move to closer to each other and a gap between the front side shoulder and the second-side shoulder reaches a predetermined gap distance, a screwing force (a force due to a friction force between the first screw part and the second screw part) when the second screw part is screwed into the first screw part and a reaction force of a welding pressure of the rear side shoulder receiving from the plate materials are balanced with each other, and thus, the state of the threaded engagement between the first screw part and the second screw part is not changed. For example, when the plate thickness of the plate material is thin during the welding, the welding pressure applied from the rear side shoulder to the plate material decreases. However, in this case, the state of the threaded engagement between the first screw part and the second screw part is changed so that the front side shoulder and the rear side shoulder move closer to each other, and the plate materials are interposed between the front side shoulder and the rear side shoulder in the state where the screwing force and the reaction force are balanced with each other. Therefore, it is possible to weld the plate materials. Accordingly, the lead angles of the first screw part and the second screw part or the like are set so that the state where the forces are balanced with each other and becomes the state where the welding pressure of the rear side shoulder with respect to the plate material is suitable during the welding. Therefore, it is possible to perform the friction stir welding at a suitable welding pressure in a state where the gap between the front side shoulder and the rear side shoulder is automatically maintained so as to be constant without providing a complicated control device or the like.

In addition, according to a friction-stir welding tool of a second aspect of the present invention, in the first aspect, the front side shoulder may include the second screw part, and the rear side shoulder and the probe may be integrated with each other.

In this way, the integrated rear side shoulder and the probe are screwed into the front side shoulder so that the first screw part and the second screw part are in threaded engagement with each other. Accordingly, it is possible to perform the friction stir welding in the state where the plate materials are easily interposed therebetween.

Moreover, according to a friction-stir welding tool of a third aspect of the present invention, in the second aspect, the second screw part may be a female screw provided in a hole part which is formed toward a direction moving away from the rear side shoulder axially from an end surface of the front side shoulder, and a diameter-expanding hole part having a larger inner diameter than an outer diameter of the probe may be formed between the second screw part and the end surface in the hole part.

In this way, the second screw part is provided, and the diameter-expanding hole part is formed. Accordingly, even when the plate thickness of the plate material is smaller than an axial size of a portion of the probe in which the first screw is not provided, that is, a portion of the probe which stirs the plate material, it is possible to insert the stirring portion into the diameter-expanding hole part. Therefore, it is possible to decrease the gap between the front side shoulder and the rear side shoulder in accordance with the plate thickness of the plate material, it is possible to flexibly cope with the change in the plate thickness of the plate material, and it is possible to maintain a suitable welding pressure applied from the rear side shoulder to the plate material.

In addition, according to a friction-stir welding tool of a fourth aspect of the present invention, in the first aspect, the rear side shoulder may include the second screw part, and the front side shoulder and the probe may be integrated with each other.

In this way, the integrated front side shoulder and probe are screwed into the rear side shoulder so that the first screw part and the second screw part are in threaded engagement with each other. Accordingly, it is possible to perform the friction stir welding in the state where the plate materials are easily interposed therebetween.

Moreover, according to a friction-stir welding tool of a fifth aspect of the present invention, in the first aspect, the front side shoulder and the rear side shoulder may include the second screw part, and the probe may include the first screw part on both axial end sections.

The probe, the front side shoulder, and the rear side shoulder are separate members, and thus, it is possible to easily manufacture each member.

In addition, according a sixth aspect of the present invention, there is provided a friction stir welding device including a friction-stir welding tool according to any one of the first to fifth aspects; a main body part which is provided on a front surface of the plate material; and a tool holding part which is attached to the main body part, holds the front side shoulder in the friction-stir welding tool, and rotates the front side shoulder with respect to the main body part with the axis as the center of rotation.

According to the friction stir welding device, when the plate thickness of the plate material is changed and the welding pressure applied from the rear side shoulder to the plate material decreases, the front side shoulder and the rear side shoulder rotate relative to each other using the friction-stir welding tool and the front side shoulder and the rear side shoulder move closer to each other. Thereafter, the screwing force generated when the second screw part is screwed into the first screw part and the reaction force of the rear side shoulder receiving from the plate materials are balanced with each other, and the state of the threaded engagement is not changed. Accordingly, it is possible to perform the friction stir welding at a suitable welding pressure in a state where the gap between the front side shoulder and the rear side shoulder is automatically maintained so as to be constant without providing a complicated control device or the like.

In addition, according to a seventh aspect of the present invention, there is provided a method for manufacturing welding material by manufacturing a welding material using a friction-stir welding tool including an axially extending front side shoulder, a rear side shoulder which is provided to axially oppose the front side shoulder, and comes into contact with plate materials to interpose an abutment portion of the plate materials between the front side shoulder and the rear side shoulder, and a probe which is disposed to penetrate the plate materials between the front side shoulder and the rear side shoulder, extends in the axis direction, and connects the front side shoulder and the rear side shoulder to each other, in which the probe includes a first screw part provided on at least one axial end section, at least one of the front side shoulder and the rear side shoulder includes a second screw part, and the second screw part is in threaded engagement with the first screw part to link at least one of the front side shoulder and the rear side shoulder with the probe, including: a preparation step of disposing the front side shoulder and the rear side shoulder to axially interpose the abutment portion of the plate materials therebetween, and allowing the probe to penetrate the plate materials; a connection step of allowing the second screw part to be in threaded engagement with the first screw part, and connecting the front side shoulder and the rear side shoulder to each other by using the probe; an adjustment step of adjusting a fastening force between the first screw part and the second screw part; and a welding step of rotating the front side shoulder and the rear side shoulder about the axis and performing friction stir welding to weld the plate materials, in a state where the first screw part and the second screw part are fastened to each other at a predetermined fastening force, in the adjustment step. The welding step includes an automatic adjustment step of automatically changing the state of the threaded engagement between the first screw part and the second screw part so that the front side shoulder and the rear side shoulder move closer to each other as the front side shoulder and the rear side shoulder rotate relative to each other.

According the method for manufacturing welding material, when the plate thickness of the plate material is changed and the welding pressure applied from the rear side shoulder to the plate material decreases while the welding step is performed, the front side shoulder and the rear side shoulder are rotated relative to each other and the front side shoulder and the rear side shoulder move closer to each other. Thereafter, the screwing force generated when the second screw part is screwed into the first screw part and the reaction force of the rear side shoulder receiving from the plate materials are balanced with each other, and the state of the threaded engagement is not changed. Accordingly, it is possible to perform the friction stir welding at a suitable welding pressure in a state where the gap between the front side shoulder and the rear side shoulder is automatically maintained so as to be constant without providing a complicated control device or the like.

Moreover, according to a method for manufacturing welding material of an eighth aspect of the present invention, in the seventh aspect, a reverse rotation step may be provided, in which the front side shoulder and the rear side shoulder are rotated about the axis in a direction opposite to the direction of the welding step at a terminal of the welding portion after the plate materials are welded in the welding step.

According to the reverse rotation step, by reversely rotating the front side shoulder and the rear side shoulder after the plate materials are welded, the rotation of the rear side shoulder is prevented by the friction force applied to the rear side shoulder from the plate material. Meanwhile, since the front side shoulder is to be reversely rotated without interference from rotation, the force by which the front side shoulder and the rear side shoulder are to be rotated relative to each other is generated between the front side shoulder and the rear side shoulder. In addition, by rotating the front side shoulder and the rear side shoulder relative to each other, it is possible to change the state of the threaded engagement between the first screw part and the second screw part so that the front side shoulder and the rear side shoulder move away from each other. Accordingly, even when the front side shoulder and the rear side shoulder adhere to each other during the welding, it is possible to easily remove the rear side shoulder from the front side shoulder. In addition, since it is possible to widen the gap between the front side shoulder and the rear side shoulder, it is possible to automatically prepare the subsequent welding work.

Advantageous Effects of Invention

According to a friction-stir welding tool, a friction stir welding device, and a method for manufacturing welding material of the present invention, it is possible to accurately perform friction stir welding while decreasing cost using a simple structure.

DESCRIPTION OF EMBODIMENTS

First Embodiment

Hereinafter, a friction stir welding device 100 of a welding material W according to a first embodiment of the present invention will be described.

The friction stir welding device 100 is a device for welding an abutment portion W1a of the plate materials W1 using friction stir welding and for manufacturing a welding material W.

Figure 1:
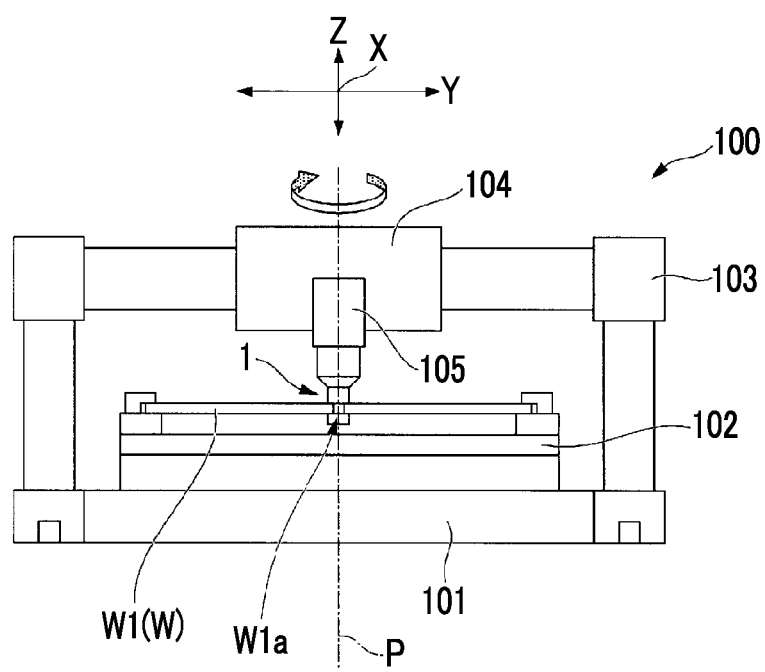
FIG. 1 is a front view showing a friction stir welding device according to a first embodiment of the present invention.

As shown in FIG. 1, the friction stir welding device 100 includes a bed 101 which is a base, a surface plate 102 which is disposed on the bed 101, a gate-shaped device main body 103 (main body part) which is provided on the bed 101 to surround the periphery of the surface plate 102, a machine head 104 (tool holding part) which is provided on the device main body 103, and a friction-stir welding tool 1 (hereinafter, simply referred to as a tool 1) which is fixed to a lower end portion of the machining head 104.

The bed 101 is formed in a plate shape and receives a reaction force during the friction stir welding.

In the surface plate 102, an upper surface of the surface plate 102 becomes a reference surface (XY plane) in a Z axis direction orthogonal to the bed 101, and plate materials W1 which are welded members are fixed to an upper surface 5a in a state where the plate materials W1 are abutted to each other.

The device main body 103 is formed in a gate shape, which rises upward from both sides in a right-left direction (Y axis direction) of the surface plate 102 in the bed 101, and thereafter, extends in a Y axis direction above the surface plate 102. Moreover, the device main body 103 is able to move in an X axis direction orthogonal to a plane parallel to the surface plate 102 in the Y axis direction.

The machining head 104 is attached to the device main body 103 above the surface plate 102, extends downward in the Z axis direction, and is provided so as to be able to move in the Y axis direction with respect to the device main body 103. In addition, the machining head 104 includes a rotary mechanism 105 which is attached to the lower portion in the Z axis direction, and is able to rotate about the Z axis.

Figure 3:
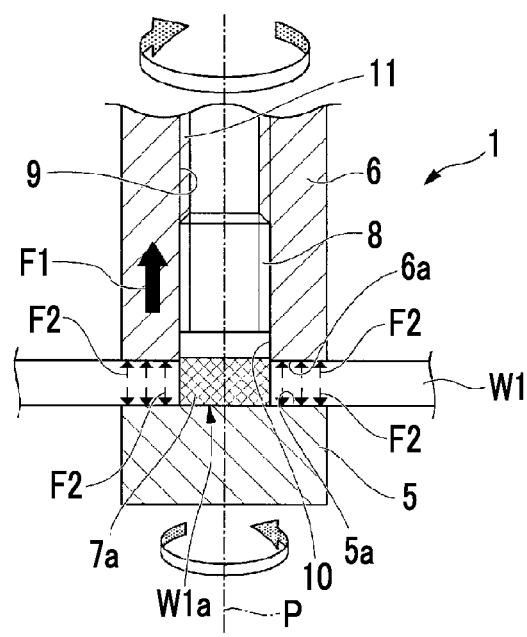
FIG. 3 is a front view showing a state where the tool used in the friction stir welding device according to the first embodiment of the present invention is enlarged, and shows a state during a welding step.

In the present embodiment, when friction stir welding is performed, the rotary mechanism 105 rotates in a clockwise direction when viewed from above in the Z axis direction (refer to arrows shown in the upper portions of FIGS. 1 and 3).

Figure 2:
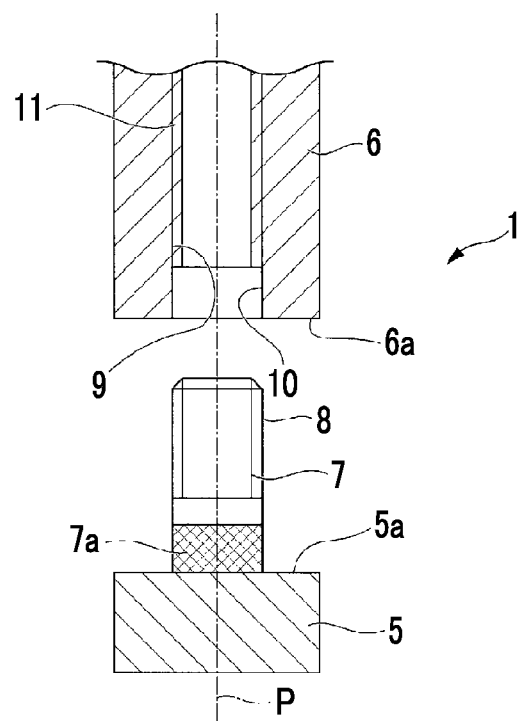
FIG. 2 is a front view showing a state where a tool used in the friction stir welding device according to the first embodiment of the present invention is disassembled.

As shown in FIG. 2, the tool 1 includes an upper shoulder 6 (front side shoulder) which is disposed at the upper portion in the Z axis direction with respect to the abutment portion W1a of two plate materials W1 abutted to each other in the Y axis direction, a lower shoulder 5 (rear side shoulder) which is disposed at the lower portion, and a probe 7 which connects the upper shoulder 6 and the lower shoulder 5.

The lower shoulder 5 is formed in a columnar shape with an axis P parallel to the Z axis direction as the center, and the upper surface 5a comes into contact with the plate material W1 when friction stir welding is performed.

The probe 7 is formed in a columnar shape which is formed so as to be coaxial with the lower shoulder 5, is linked with the lower shoulder 5, and extends upward in the Z axis direction along the axis P from the upper surface 5a of the lower shoulder 5. Moreover, the probe 7 is a rod-shaped member having a smaller diameter than an outer diameter of the lower shoulder 5, and is disposed so as to penetrate the abutment portion W1a in the Z axis direction. Moreover, the probe 7 includes a male screw part 8 (first screw part) which is formed on the upper end section in the Z axis direction. In the present embodiment, the male screw part 8 is a right-hand screw.

Here, in the present embodiment, the probe 7 is provided integrally with the lower shoulder 5. In addition, a stirring groove 7a, which promotes stirring of the plate material W1 during the welding, is formed on an outer circumferential surface of the probe 7 which comes into contact with the plate material W1 during the welding in the position at which the probe 7 penetrates the plate material W1.

The upper shoulder 6 is formed in an approximately columnar shape which is formed coaxially with the lower shoulder 5 and the probe 7, and includes a female screw part 11 (second screw part) with which the male screw part 8 of the probe 7 is able to be in threaded engagement. Moreover, the upper shoulder 6 is attached to and held by the rotary mechanism 105 of the machining head 104, and a lower surface 6a of the upper shoulder 6 comes into contact with the plate material W1.

The female screw part 11 includes a hole part 9 which is formed so as to be recessed in a direction moving away from the lower shoulder 5 along the axis P from the lower surface 6a (end surface) of the upper shoulder 6, that is, upward in the Z axis direction.

In the hole part 9, a diameter-expanding hole part 10 is formed, and the diameter-expanding hole part 10 has an inner diameter which is larger than the outer diameter of the probe 7, that is, the outer diameter of the probe 7 at the position at which the stirring groove 7a is formed, between the position of the female screw part 11 and the lower surface 6a of the upper shoulder 6.

The tool 1 is a bobbin tool which integrally rotates the upper shoulder 6, the probe 7, and the lower shoulder 5 in the state where two plate materials W which are the welded members are interposed in the Z axis direction, and performs the friction stir welding.

Here, the rotary mechanism 105 or the surface plate 102 can be lifted and lowered in the Z axis direction, and can adjust a relative position between the plate material W1 fixed to the surface plate 102 and the tool 1 in the Z axis direction.

Moreover, the friction stir welding device 100 of the present embodiment is an example. For example, the tool 1 may be fixed so as not to move in the XY plane, and the surface plate 102 may move in the XY plane. Accordingly, the positions of the surface plate 102 in the X axis direction and the Y axis direction may be adjusted.

Figure 4:
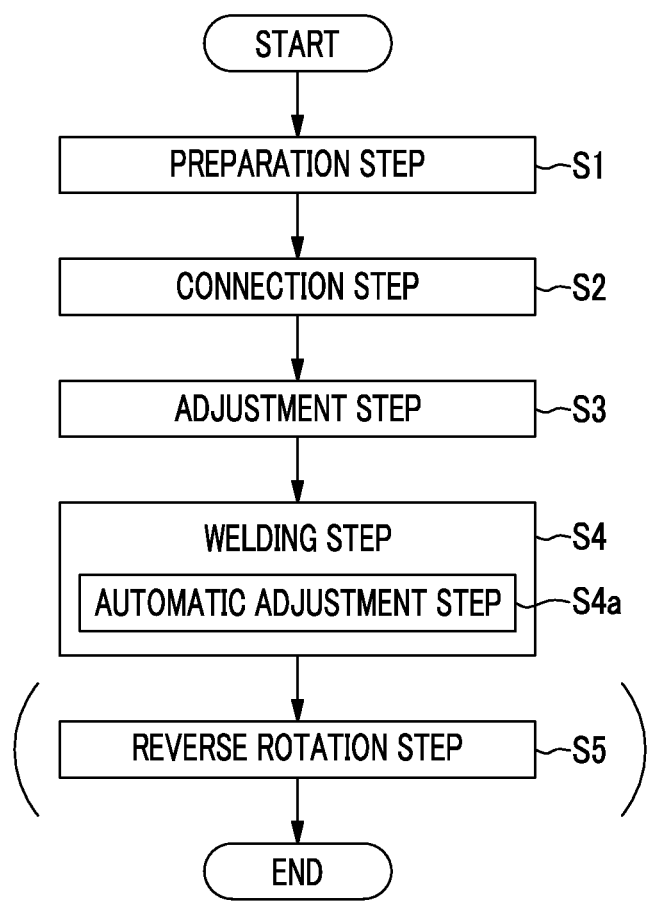
FIG. 4 is a flow chart showing a procedure of a method for manufacturing welding material used in the friction stir welding device according to the first embodiment of the present invention.

Next, with reference to FIGS. 3 and 4, a method for manufacturing the welding material W using the friction stir welding device 100 will be described.

The method for manufacturing the weld material W includes a preparation step S1 of preparing the welding, a connection step S2 of connecting the upper shoulder 6 and the lower shoulder 5 to each other, an adjustment step S3 of adjusting a fastening force between the probe 7 and the upper shoulder 6, and a welding step S4 of welding the plate materials W1.

First, the preparation step S1 is performed. In the preparation step S1, the upper shoulder 6 is disposed farther above in the Z axis direction from the plate material W1 so as to interpose the abutment portion W1a of the plate material W1 in the direction of the axis P, that is, the Z axis direction, and is fixed to the machining head 104. Moreover, the lower surface 5 is disposed farther below in the Z axis direction from the plate material W1. In addition, the probe 7 penetrates the abutment portion W1a of the plate material W1 in the Z axis direction.

Moreover, when an end tab (not shown) is installed on the plate material W1, the probe 7 is disposed to penetrate the end tab.

Next, the connection step S2 is performed. In the connection step S2, the male screw part 8 of the probe 7 is in threaded engagement with the female screw part 11 of the upper shoulder 6, and the upper shoulder 6 and the low shoulder 5 are connected to each other via the probe 7.

Next, the adjustment step S3 is performed. In the adjustment step S3, the fastening force between the male screw part 8 of the probe 7 and the female screw part 11 of the upper shoulder 6 is adjusted so that the upper surface 5 of the lower shoulder 5 is pressed to the plate material W1 with a predetermined welding pressure.

Next, the welding step S4 is performed. In the welding step S4, in the state where the male screw part 8 of the probe 7 and the female screw part 11 of the upper shoulder 6 are fastened to each other with a predetermined fastening force in the adjustment step S3, the upper shoulder 6 and the lower shoulder 5 rotate about the axis P to perform the friction stir welding, the plate materials W1 are welded, and the welding material W is manufactured.

Here, the welding step S4 includes an automatic adjustment step S4a. In the automatic adjustment step S4a, the state of the threaded engagement between the male screw part 8 and the female screw part 11 is automatically changed so that the upper shoulder 6 and the lower shoulder 5 move close to each other as the upper shoulder 6 and the lower shoulder 5 rotate relative to each other.

More specifically, in the welding step S4, the upper shoulder 6 and the lower shoulder 5 rotate in a clockwise direction when viewed from above in the Z axis direction in the state where the plate material W1 is interposed between the upper shoulder 6 and the lower shoulder 5. Therefore, the plate materials W1 are welded through the friction stir welding. Here, the lower shoulder 5 comes into contact with the plate material W1 and is connected to the upper shoulder 6 via the probe 7. Accordingly, a friction force is applied to a portion between the lower shoulder 5 and the plate material W1 during the welding, and the rotation of the lower shoulder 5 is prevented by the friction force.

Meanwhile, since the upper shoulder 6 is to be rotated by a rotating force applied from the rotary mechanism 105 without interference from rotation, a force by which the upper shoulder 6 and the lower shoulder 5 are to be rotated relative to each other is generated between the upper shoulder 6 and the lower shoulder 5.

In addition, the probe 7 rotates in a counterclockwise direction (refer to an arrow direction shown in the lower portion of FIG. 3) when viewed from above in the Z axis direction with respect to the upper shoulder 6 rotating in a clockwise direction when viewed from above in the Z axis direction according to the relative rotation, and the male screw part 8 of the probe which is formed in a right-hand screw rotates in a direction in which the male screw part 8 is fastened to the female screw part 11. That is, the state of the threaded engagement between the first screw part and the second screw part is changed so that the upper shoulder 6 and the lower shoulder 5 move closer to each other.

In the friction stir welding device 100, during the welding step S4, the upper shoulder 6 and the lower shoulder 5 move closer to each other in the direction of the axis P in the automatic adjustment step S3. Accordingly, when the gap between the upper shoulder 6 and the lower shoulder 5 reaches a predetermined gap distance, a screwing force F1 (a force generated by a friction force between the male screw part 8 and the female screw part 11) generated when the female screw part 11 of the upper shoulder 6 is screwed onto the male screw part 8 of the probe 7 and a reaction force F2 of a welding pressure of the lower shoulder 5 receiving from the plate material W1 are balanced with each other, and the state of the threaded engagement between the male screw part 8 and the female screw part 11 is not changed more than in the balanced state.

Figure 5:
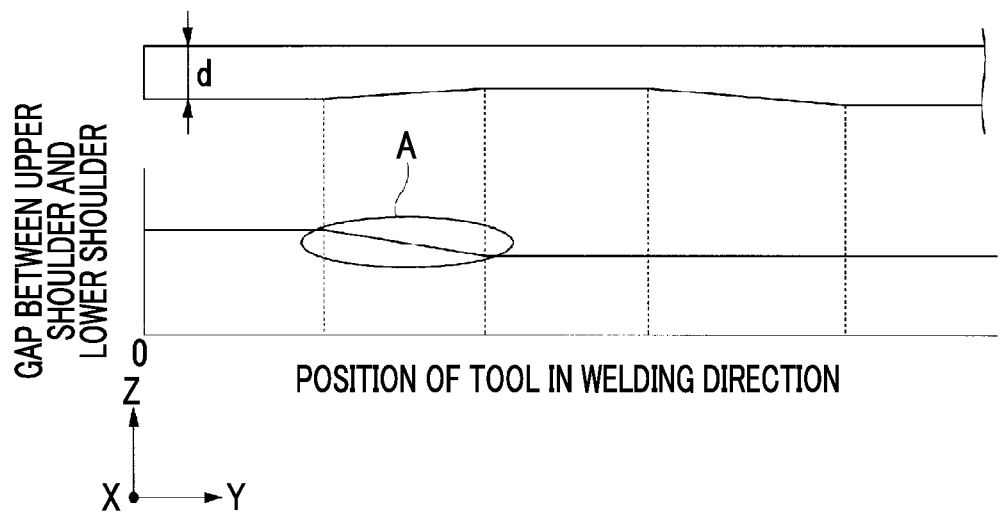
FIG. 5 is a view showing a relationship between a change of a plate thickness of a work-piece along a welding direction and a change of a gap between an upper shoulder and a lower shoulder in the friction stir welding device according to the first embodiment of the present invention.

Here, as shown in FIG. 5, when the plate thickness (d shown FIG. 5) of the plate material W1 is changed in a welding direction (in the present embodiment, the X axis direction shown in FIGS. 1 and 5) and when the plate thickness of the plate material W1 decreases, the welding pressure of the upper shoulder 6 applied to the plate material W1 decreases.

In this case, as shown by A portion in FIG. 5, the state of the threaded engagement between the male screw part 8 and the female screw part 11 is automatically changed so that the upper shoulder 6 and the lower shoulder 5 move closer to each other in the automatic adjustment step S4, the plate material W1 is interposed between the upper shoulder 6 and the lower shoulder 5 in the Z axis direction in the state where the screwing force F1 and the reaction force F2 are balanced with each other, and it is possible to weld the plate material W1.

Figure 6:
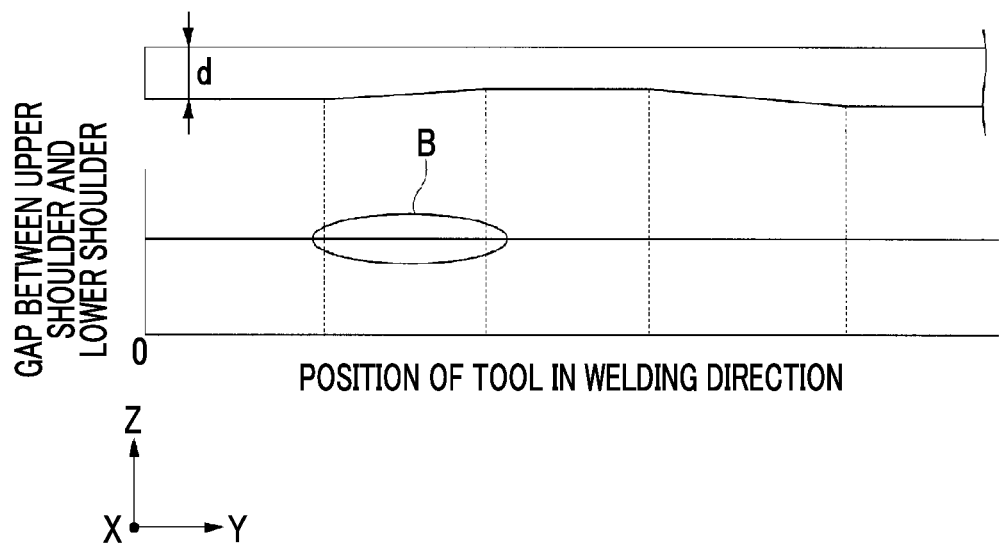
FIG. 6 is a view showing a relationship between a change of a plate thickness of a work-piece along a welding direction and a change of a gap between an upper shoulder and a lower shoulder in a friction stir welding device of a related art.

Meanwhile, as shown in FIG. 6, in a case where the male screw part 8 and the female screw part 11 of the present embodiment are not provided and the automatic adjustment step S4 is not performed, even when the plate thickness of the plate material W1 decreases in the welding direction, as shown by B portion in FIG. 6, the gap between the upper shoulder 6 and the lower shoulder 5 is not adjusted. Accordingly, the welding is performed in a state where a sufficient welding pressure is not applied from the lower shoulder 5 to the plate material W1.

Accordingly, in the present embodiment, lead angles of the male screw part 8 and the female screw part 11 or the like are set to predetermined values so that the state where the screwing force F1 and the reaction force F2 are balanced with each other becomes a state where the welding pressure of the lower shoulder 5 applied to the plate material W1 during the welding is suitable. Accordingly, it is possible to allow the lower shoulder 5 to come into contact with the plate material W1 and to perform the friction stir welding at a suitable welding pressure in a state where the gap between the upper shoulder 6 and the lower shoulder 5 is automatically maintained so as to be constant without providing a complicated control device or the like.

Moreover, in the present embodiment, the integrated lower shoulder 5 and the probe 7 are screwed into the upper shoulder 6 so that the male screw part 8 of the probe 7 and the female screw part 11 of the upper shoulder 6 are in threaded engagement. Accordingly, it is possible to easily connect the upper shoulder 6 and the lower shoulder 5 to each other.

Moreover, the plate thickness of the plate material W1 may be smaller than the size in the axis P of the portion of the probe 7 in which the male screw part 8 is not provided, that is, the portion in which the stirring groove 7a stirring the plate material W1 is provided. In this case, the portion of the probe 7 in which the stirring groove 7a is formed enters the diameter-expanding hole part 10 of the upper shoulder 6. Accordingly, it is possible to decrease the gap between the upper shoulder 6 and the lower shoulder 5 in accordance with the plate thickness of the plate material W1. Therefore, it is possible to flexibly cope with the change of the plate thickness of the plate material W1, and it is possible to maintain a suitable welding pressure applied from the lower shoulder 5 to the plate material W1.

According to the friction stir welding device 100 of the present embodiment, the upper shoulder 6, the lower shoulder 5, and the probe 7 rotate, and it is possible to automatically adjust the gap between the upper shoulder 6 and the lower shoulder 5 by using the forces mutually acting between the shoulders and the plate material W1. Accordingly, it is possible to accurately perform the friction stir welding while decreasing cost using a simple structure.

Moreover, a shape, into which a spanner or a wrench can be fitted, may be formed on the outer circumferential surface of the lower shoulder 5. In this case, adjustment with respect to fastening of the upper shoulder 6 or removal of the lower shoulder 5 from the upper shoulder 6 can be easily performed, and usability is improved.

In addition, in the method for manufacturing the welding material W, a reverse rotation step S5 (refer to FIG. 4) may be provided, in which the upper shoulder 6 and the lower shoulder 5 are rotated in a direction opposite to the direction when the welding step S4 is performed, that is, in a counterclockwise direction about the axis P when viewed from above in the Z axis direction, at a terminal of the welding portion after the welding step S4 is performed.

According to the reverse rotation step S5, by rotating the upper shoulder 6 and the lower shoulder 5 in a counterclockwise direction after the plate materials W1 are welded, the rotation of the lower shoulder 5 is prevented by the friction force applied to the lower shoulder 5 from the plate material W1. Meanwhile, since the upper shoulder 6 is to be rotated in a counterclockwise direction without interference due to rotation, the force by which the upper shoulder 6 and the lower shoulder 5 are to be rotated relative to each other is generated between the upper shoulder 6 and the rear side shoulder 6.

In addition, the probe 7 rotates in a clockwise direction when viewed from above in the Z axis direction with respect to the upper shoulder 6 rotating in a counterclockwise direction when viewed from above in the Z axis direction according to the relative rotation, and the male screw part 8 of the probe 7 which is formed in a right-hand screw rotates in a direction in which the male screw part 8 is loosened with respect to the female screw part 11.

Accordingly, since the upper shoulder 6 and the lower shoulder 5 can move away from each other, even when the upper shoulder 6 and the lower shoulder 5 adhere to each other by a portion of the plate material W1 stirred when the friction stir welding is performed, during the welding, it is possible to easily remove the lower shoulder 5 from the upper shoulder 6. In addition, since it is possible to widen the gap between the upper shoulder and the lower shoulder 5, it is possible to automatically prepare the subsequent welding work.

Moreover, when the friction stir welding is performed, the tool 1 may rotate in a counterclockwise direction when viewed from above in the Z axis direction. However, in this case, it is possible to perform the automatic adjustment step S4a by manufacturing the male screw part 8 of the probe 7 to a left-hand screw.

Moreover, a groove recessed in the Z axis direction may be formed on at least one of the lower surface 6a of the upper shoulder 6 and the upper surface 5a of the lower shoulder 5. Even when the plate thickness of the plate material W1 increases in the welding direction, since it is possible to cope with the excessive thickness with the groove, it is possible to perform the welding corresponding to variation in the plate thickness.

Second Embodiment

Figure 7:
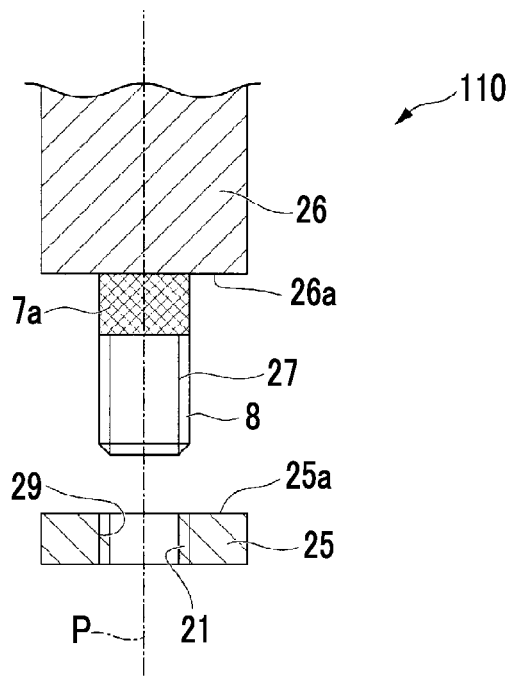
FIG. 7 is a front view showing a state where a tool used in a friction stir welding device according to a second embodiment of the present invention is disassembled.
Figure 8:
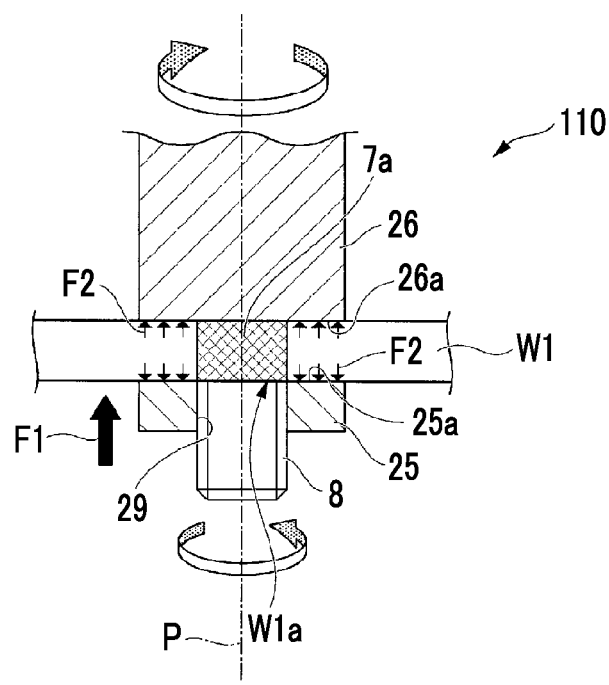
FIG. 8 is a front view showing a state where the tool used in the friction stir welding device according to the second embodiment of the present invention is enlarged, and shows a state during a welding step.

Next, with reference to FIGS. 7 and 8, a friction stir welding device 110 according to a second embodiment of the present invention will be described.

The same reference numerals are assigned to the components in common with the first embodiment, and detailed descriptions thereof are omitted.

The present embodiment is different from the first embodiment in that a probe 27 is provided integrally with an upper shoulder 26 in the present embodiment.

The upper shoulder 26 is a member approximately similar to the upper shoulder 6 of the first embodiment. However, in the upper shoulder 26, the female screw part 11, the hole part 9, and the diameter-expanding hole part 10 are not provided.

The probe 27 is formed in a columnar shape in which the probe 27 is coaxial with the upper shoulder 26, which is approximately similar to the first embodiment. In addition, the probe 27 is linked with the upper shoulder 26 and extends downward in the Z axis direction along the axis P from the lower surface 26a of the upper shoulder 26. In addition, the probe 27 includes the male screw part 8 (first screw part) on the lower end section in the Z axis direction, and in the present embodiment, the male screw part 8 is a right-hand screw.

A lower shoulder 25 is a member which has a shape approximately similar to that of the first embodiment, and includes a female screw part 21 (second screw part) with which the male screw part 8 of the probe 27 can be in threaded engagement.

The female screw part 21 is provided on a hole part 29 which is formed to penetrate the lower shoulder 25 in a direction moving away from the upper shoulder 26 along the axis P from an upper surface 25a (end surface) of the lower shoulder 25, that is, downward in the Z axis direction.

In addition, in the present embodiment, a part corresponding to the diameter-expanding hole part 10 of the first embodiment is formed in the hole part 29. However, the part corresponding to the diameter-expanding hole part 10 may be formed between the upper surface 25a of the lower shoulder 25 and the female screw part 21.

According to the friction stir welding device 110 of the present embodiment, the integrated upper shoulder 26 and probe 27 are screwed into the lower shoulder 25 so that the male screw part 8 of the probe 27 and the female screw part 21 of the lower shoulder 25 are in threaded engagement. Accordingly, it is possible to easily connect the upper shoulder 26 and the lower shoulder 25 to each other. In addition, it is possible to automatically adjust the gap between the upper shoulder 26 and the lower shoulder 25 by the forces mutually acting between the shoulders and the plate material W1 during the welding of the plate materials W1. Accordingly, it is possible to accurately perform the friction stir welding while decreasing cost using a simple structure.

Third Embodiment

Figure 9:
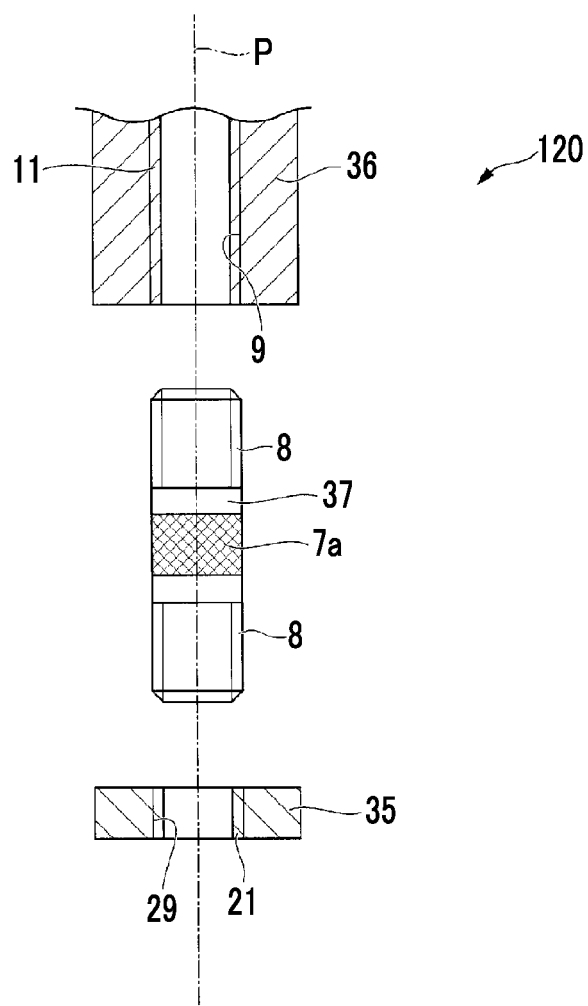
FIG. 9 is a front view showing a state where a tool used in a friction stir welding device according to a third embodiment of the present invention is disassembled.

Next, with reference to FIG. 9, a friction stir welding device 120 according to a third embodiment of the present invention will be described.

The same reference numerals are assigned to the components in common with the first and second embodiments, and detailed descriptions thereof are omitted.

The present embodiment is different from the first and second embodiments in that a probe 37, an upper shoulder 36, and a lower shoulder 35 are separately provided in the present embodiment.

The probe 37 includes male screw parts 8 which are formed on both end sections of the axis P.

The upper shoulder 36 is a member approximately similar to the upper shoulder 6 in the first embodiment, and includes the female screw part 11 in the hole part 9.

The lower shoulder 35 is a member approximately similar to the lower shoulder 25 in the second embodiment, and includes the female screw part 21 in the hole part 29.

According to the friction stir welding device 120 of the present embodiment, since the probe 37, the upper shoulder 36, and the lower shoulder 35 are separate members, each member is easily manufactured. In addition, when the plate materials W1 are welded, it is possible to automatically adjust the gap between the upper shoulder 36 and the lower shoulder 35 by the forces mutually acting between the shoulders and the plate material W1. Accordingly, it is possible to accurately perform the friction stir welding while decreasing cost using a simple structure.

Hereinbefore, preferred embodiments of the present invention are described. However, the present invention is not limited to the embodiments. Addition, omission, replacement, and other modifications of a configuration may be performed within a range which does not depart from the gist of the present invention. The present invention is not limited by the descriptions, and is limited by only attached claims.

INDUSTRIAL APPLICABILITY

The present invention relates to a friction-stir welding tool used when plate materials W1 are abutted to each other to be welded, a friction stir welding device including the friction-stir welding tool, and a method for manufacturing welding material which manufactures a welding material using the friction-stir welding tool. According to the friction-stir welding tool, the friction stir welding device, and the method for manufacturing welding material, it is possible to accurately perform friction stir welding while decreasing cost using a simple structure.

REFERENCE SIGNS LIST

1 . . . tool (friction-stir welding tool), 5, 25, 35 . . . lower shoulder (rear side shoulder), 5a, 25a . . . upper surface, 6, 26, 36 . . . upper shoulder (front side shoulder), 6a, 26a . . . lower surface, 7, 27, 37 . . . probe, 7a . . . stirring groove, 8 . . . male screw part (first screw part), 9 . . . hole part, 10 . . . diameter-expanding hole part, 11, 21 . . . female screw part (second screw part), 29 . . . hole part, 100, 110, 120 . . . friction stir welding device, 101 . . . bed, 102 . . . surface plate, 103 . . . device main body (main body part), 104 . . . machining head (tool holding part), 105 . . . rotary mechanism, W . . . welding material, W1 . . . plate material, W1a . . . abutment portion, P . . . axis, S1 . . . preparation step, S2 . . . connection step, S3 . . . adjustment step, S4 . . . welding step, S4a . . . automatic adjustment step, S5 . . . reverse rotation step, F1 . . . screwing force, F2 . . . reaction force

The invention claimed is:

1. A friction-stir welding tool, comprising:
a front side shoulder extending in an axis direction;
a rear side shoulder which is provided to axially oppose the front side shoulder, and comes into contact with plate materials to interpose an abutment portion of the plate materials between the front side shoulder and the rear side shoulder; and
a probe which is disposed to penetrate the plate materials between the front side shoulder and the rear side shoulder, extends in the axis direction, and connects the front side shoulder and the rear side shoulder to each other,
wherein the probe includes a first screw part provided on at least one end section in the axis direction and a stirring groove which is provided to a portion of the probe in which the first screw part is not provided,
wherein at least one of the front side shoulder and the rear side shoulder includes a second screw part which is provided in a hole part formed in the axis direction from an end surface of the at least one of the front side shoulder and the rear side shoulder, the second screw part is in threaded engagement with the first screw part, and a state of the threaded engagement is changed so that the front side shoulder and the rear side shoulder axially move closer to each other as the front side shoulder and the rear side shoulder rotate relative to each other, and the second screw part links at least one of the front side shoulder and the rear side shoulder with the probe due to the threaded engagement between the first screw part and the second screw part,
wherein lead angles of the first screw part and the second screw part are set such that a state where a screwing force when the state of the threaded engagement is changed and the second screw part is screwed into the first screw part and a reaction force of a welding pressure of the rear side shoulder receiving from the plate material are balanced with each other becomes a state where the welding pressure of the rear side shoulder with respect to the plate material is suitable during the welding, and
wherein a diameter-expanding hole part having a larger constant inner diameter than an outer diameter of the stirring groove of the probe is formed between the second screw part and the end surface in the hole part.

2. The friction-stir welding tool according to claim 1, wherein the front side shoulder includes the second screw part, and
wherein the rear side shoulder and the probe are integrated with each other.

3. The friction-stir welding tool according to claim 1, wherein the rear side shoulder includes the second screw part, and
wherein the front side shoulder and the probe are integrated with each other.

4. The friction-stir welding tool according to claim 1, wherein the front side shoulder and the rear side shoulder includes the second screw part, and
wherein the probe includes the first screw part on both end sections in the axis direction.

5. A friction stir welding device, comprising:
a friction-stir welding tool according to claim 1;
a main body part which arranged at a front surface side of the plate material; and
a tool holding part which is attached to the main body part, holds the front side shoulder in the friction-stir welding tool, and rotates the front side shoulder with respect to the main body part with the axis as the center of rotation.

6. A method for manufacturing welding material using a friction-stir welding tool including a front side shoulder extending in an axis direction, a rear side shoulder which is provided to oppose the front side shoulder in the axis direction, and comes into contact with plate materials to interpose an abutment portion of the plate materials between the front side shoulder and the rear side shoulder, and a probe which is disposed to penetrate the plate materials between the front side shoulder and the rear side shoulder, extends in the axis direction, and connects the front side shoulder and the rear side shoulder to each other, in which the probe includes a first screw part provided on at least one end section in the axis direction and a stirring groove which is provided to a portion of the probe in which the first screw part is not provided, at least one of the front side shoulder and the rear side shoulder includes a second screw part which is provided in a hole part formed in the axis direction from an end surface of the at least one of the front side shoulder and the rear side shoulder, and the second screw part is in threaded engagement with the first screw part to link the at least one of the front side shoulder and the rear side shoulder with the probe, comprising:
a preparation step of disposing the front side shoulder and the rear side shoulder to interpose the abutment portion of the plate materials between the front side shoulder and the rear side shoulder in the axis direction, and allowing the probe to penetrate the plate materials;
a connection step of allowing the second screw part to be in threaded engagement with the first screw part, and connecting the front side shoulder and the rear side shoulder to each other by using the probe;
an adjustment step of adjusting a fastening force between the first screw part and the second screw part; and
a welding step of rotating the front side shoulder and the rear side shoulder about the axis and performing friction stir welding to weld the plate materials, in a state where the first screw part and the second screw part are fastened to each other at a predetermined fastening force, in the adjustment step, wherein the welding step includes an automatic adjustment step of automatically changing the state of the threaded engagement between the first screw part and the second screw part so that the front side shoulder and the rear side shoulder move closer to each other as the front side shoulder and the rear side shoulder rotate relative to each other, and wherein, in the automatic adjustment step, the portion of the probe in which the stirring groove is provided enters a diameter-expanding hole part which is formed between the second screw part and the end surface in the hole part and has a larger constant inner diameter than an outer diameter of the stirring groove of the probe in a case a thickness of the plate material becomes smaller than a size of the stirring groove in the axis direction.

7. The method for manufacturing welding material according to claim 6, further comprising:
a reverse rotation step of rotating the front side shoulder and the rear side shoulder about the axis in a direction opposite to the direction of the welding step at a terminal of the welding portion after the plate materials are welded in the welding step.

8. A friction stir welding device, comprising:
a friction-stir welding tool according to claim 1;
a main body part which arranged over a front surface side of the plate material; and
a tool holding part which is attached to the main body part, holds the front side shoulder in the friction-stir welding tool, and rotates the front side shoulder with respect to the main body part with the axis as the center of rotation.

* * * * *